(12) United States Patent
Schube

(10) Patent No.: US 8,104,975 B2
(45) Date of Patent: Jan. 31, 2012

(54) OPTICAL WAVEGUIDE PLUG PART

(75) Inventor: Frank Schube, Gummersbach (DE)

(73) Assignee: Beckoff Automation GmbH, Verl (DE)

(*) Notice: Subject to any disclaimer, the term of this patent is extended or adjusted under 35 U.S.C. 154(b) by 297 days.

(21) Appl. No.: 12/595,654

(22) PCT Filed: Apr. 11, 2008

(86) PCT No.: PCT/EP2008/002895
§ 371 (c)(1),
(2), (4) Date: Oct. 13, 2009

(87) PCT Pub. No.: WO2008/125304
PCT Pub. Date: Oct. 23, 2008

(65) Prior Publication Data
US 2010/0054667 A1    Mar. 4, 2010

(30) Foreign Application Priority Data
Apr. 13, 2007   (DE) .................. 10 2007 017 520

(51) Int. Cl.
*G02B 6/36* (2006.01)
(52) U.S. Cl. ........................................................ 385/87
(58) Field of Classification Search ............... 385/86–87
See application file for complete search history.

(56) References Cited

U.S. PATENT DOCUMENTS

| | | | |
|---|---|---|---|
| 4,986,625 A | 1/1991 | Yamada et al. | |
| 5,044,719 A | 9/1991 | Nakamura | |
| 5,121,455 A | 6/1992 | Palecek | |
| 5,452,386 A | 9/1995 | Van Woesik | |
| 5,553,181 A | 9/1996 | Van Woesik | |
| 6,203,211 B1 | 3/2001 | Cheng | |
| 6,592,267 B1 | 7/2003 | Cheng | |

FOREIGN PATENT DOCUMENTS

| | | |
|---|---|---|
| DE | 9010357 U1 | 9/1990 |
| DE | 10131273 C1 | 12/2002 |
| DE | 10 2004 058741 A1 | 6/2006 |
| EP | 0290188 A | 11/1988 |
| EP | 0517346 A | 12/1992 |
| EP | 0608627 A | 8/1994 |
| EP | 0770891 A | 5/1997 |
| EP | 0803751 A | 10/1997 |
| EP | 0869378 A | 10/1998 |

(Continued)

OTHER PUBLICATIONS

International Search Report Corresponding to PCT/EP2008/002895, dated Jan. 8, 2009.

(Continued)

*Primary Examiner* — Jerry Rahll
(74) *Attorney, Agent, or Firm* — Kevin P. Radigan, Esq.; Heslin Rothenberg Farley & Mesiti P.C.

(57) ABSTRACT

The invention relates to an optical waveguide plug part of an optical waveguide plug connector for an optical waveguide, which has a fiber and a sheath, with a contact carrier for receiving the optical waveguide and at least one clamping part for securing the optical waveguide in the contact carrier. According to the invention, the clamping part has a first clamping section with at least one and preferably several free-standing and/or column-shaped clamping webs for clamping the sheath of the optical waveguide and a second clamping section with at least one and preferably several free-standing and/or column-shaped clamping webs for clamping the fiber of the optical waveguide.

20 Claims, 2 Drawing Sheets

FOREIGN PATENT DOCUMENTS

| | | |
|---|---|---|
| EP | 1321783 A | 6/2003 |
| FR | 2658956 A | 8/1991 |
| JP | 02029010 U | 2/1990 |
| WO | WO 03085434 A | 10/2003 |
| WO | WO2007/124883 A | 11/2007 |

OTHER PUBLICATIONS

English Translation of International Preliminary Report on Patentability corresponding to PCT/EP2008/002895.

OPTICAL WAVEGUIDE PLUG PART

CROSS REFERENCE TO RELATED APPLICATIONS

This application is a national stage filing under section 371 of International Application No. PCT/EP2008/002895, filed on Apr. 11, 2008, and published in German on Oct. 23, 2008, as WO 2008/125304 A3, and which claims priority of German application No. 10 2007 017 520.7, filed on Apr. 13, 2007 the entire disclosure of these applications being hereby incorporated herein by reference.

TECHNICAL FIELD

The invention relates to an optical waveguide plug part and connector for an optical waveguide.

BACKGROUND OF THE INVENTION

One embodiment of an optical waveguide plug part is disclosed, for example, in DE 101 26 659 A1.

In order to design the plug part so that it is water-tight, the prior art proposes screwing the optical waveguide into an inner thread which is formed in the interior of the optical waveguide plug part and cuts into the insulation of the optical waveguide.

Although the known optical waveguide plug part creates a good seal and a secure retention of the optical waveguide in the optical waveguide plug part, it has the disadvantage that the production is expensive and difficult owing to the torque to be exerted on the optical waveguide.

Furthermore, optical waveguide plug parts are known in which a metal part is arranged in an opening in the optical waveguide plug part and clamps the core of the optical waveguide. Since no sealing elements are provided, these known optical waveguide plug parts are not water-tight. Moreover, in the case of these known optical waveguide plug parts, the optical waveguide strain relief brought about by the clamping part is small.

SUMMARY OF THE INVENTION

It is the object of the invention to provide an optical waveguide plug part according to the precharacterising clause of Claim 1, which can be easily produced and has a good strain relief.

The object of the invention is achieved by an optical waveguide plug part according to the features of Claim 1. Advantageous developments of the invention are stated in the dependent claims.

According to one embodiment of the invention, an optical waveguide plug part comprises an optical waveguide plug connector for an optical waveguide, which has a fibre and a covering, a contact carrier for receiving the optical waveguide and at least one clamping part for securing the optical waveguide in the contact carrier, the clamping part having a first clamping section with at least one and preferably several free-standing and/or columnar clamping web for clamping the covering of the optical waveguide and a second clamping section with at least one and preferably several free-standing and/or columnar clamping web for clamping the fibre of the optical waveguide.

This has the advantage of simple assembly and better strain relief. In the case of optical waveguides having strain relief fibres, these can likewise be better secured via the blade elements. It is also possible in principle to use a plurality of clamping parts which in each case have two clamping sections or one clamping section. An embodiment having one clamping section is preferred because assembly and sealing are facilitated.

DE 10 2006 019 872 A1 is an later published application disclosing a waveguide plug part having two clamping sections, wherein contrary to the present invention the clamping sections do not comprise free-standing and/or columnar clamping webs.

In terms of the present application the term 'free-standing clamping web' is to be understood, that the clamping webs are formed free-standing. One could call the free-standing clamping webs also columnar clamping webs. In other words the free-standing and/or columnar clamping webs are arranged in accordance with the invention on a common base (standing on this base) and do not comprise additional lateral supports, i.e. there are no bars and side walls, respectively, connecting (laterally) neighbouring clamping webs with one another, i.e. clamping webs being arranged at the same side of the optical waveguide.

It is evident, that for embodiments having clamping webs arranged in pairs, the clamping webs opposing each other cannot be connected with each other, because the waveguide is to be clamped between these clamping webs. Therefore, the feature 'free-standing' relates to the missing lateral connection (above the base) between laterally neighbouring clamping webs.

According to the invention, the free-standing and/or columnar clamping webs of the first and/or second clamping section can be arranged in pairs such that the clamping webs of one respective pair are arranged oppositely with respect to the optical waveguide.

According to the invention, the free-standing and/or columnar clamping webs of the first clamping section may comprise blade edges for cutting into the covering of the optical waveguide. Alternatively or additionally, the free-standing and/or columnar clamping webs of the second clamping section may comprise blade edges for cutting into the fibre of the optical waveguide. Thus, the blade edges may preferably be substantially perpendicular to the direction in which the optical waveguide can be inserted or is inserted into the optical waveguide plug part.

According to the invention, the blade edges may have a barb-like profile in cross-section. This has the advantage that the barb profile can be formed in such a way that a tensile force exerted on the optical waveguide is counteracted. There is therefore better strain relief because the material of the covering or of the fibre insulation cannot slip so easily over the blade elements. During assembly, the blade edges can easily be cut into the covering and/or the fibre insulation if, is as preferred, the barb structure is perpendicular to the cutting direction.

According to the invention, at least one pin and preferably several pins for engaging into the covering of the optical waveguide can be formed in the first clamping section.

According to the invention, at least one pin and preferably several pins for engaging into the fibre of the optical waveguide can be formed in the second clamping section.

According to the invention, at least one pin and preferably several pins for engaging into the covering and/or the fibre of the optical waveguide can be formed in the contact carrier.

According to the invention, the pins may be arranged and formed such that they engage into the covering and/or fibre of the optical waveguide on assembly.

According to the invention, the pins may be arranged and formed such that they pierce the covering and/or fibre of the optical waveguide on assembly. Thereby an even better strain relief is established.

Especially with embodiments of the invention having pins, it is to be taken care of not touching or damaging the core the optical waveguide. With embodiments where the covering and/or the fibre is pierced, the pins are to be arranged out of the centre. Preferably pairs of symmetrically arranged pairs are provided then.

According to the invention, the pins may be arranged and formed in opposite pairs at the contact carrier and the clamping part. Thereby it follows the advantage of a support, such that the pins can pierce into the covering and the fibre, respectively, with less load of the optical waveguide.

According to the invention, the pins may be arranged and formed at the contact carrier opposite to at least one clamping web or several clamping webs and preferably opposite to all clamping webs. Thereby it follows the advantage of a support, such that the clamping webs can pierce into the covering and the fibre, respectively, with less load of the optical waveguide.

According to the invention, the clamping part and/or the contact carrier, can be formed at least partly transparent and/or translucent. Thereby it follows the advantage, that the correct arrangement of the optical waveguide in the optical waveguide plug part can easily be determined and checked from outside after assembly.

According to the invention, the clamping part may be formed completely transparent and/or translucent.

According to the invention, the contact carrier may be formed transparent and/or translucent at least in the region of the receiving section for the clamping part.

According to the invention, the clamping part and/or the contact carrier may be provided with colour marking for identification of the position of the optical waveguide in the optical waveguide plug part.

According to the invention, at least one seal may be arranged on the clamping part. Thereby it follows the advantage, that the optical waveguide plug part which can be easily produced and has good tightness.

According to the invention, the seal may be an O-ring.

According to the invention, the clamping part may have a flange for receiving the seal.

According to the invention, the clamping part may have a groove for receiving the seal. Alternatively or additionally, the contact carrier may have a groove for receiving the seal. Alternatively or additionally, the contact carrier may have a step for receiving the seal.

According to the invention, the seal may be arranged along the opening of the contact carrier, in which opening the clamping part for securing the optical waveguide is arranged or can be arranged.

According to the invention, a (possibly further) seal which is arranged in such a way that the fibre of the optical waveguide can be inserted through the seal may be provided. This is an alternative or additional solution to the arrangement of the seal. The (further) seal is inserted into the contact carrier, and the optical waveguide is pushed or turned into the optical waveguide plug part and secured with the clamping part. Preferably, the (further) seal may be encompassed by the clamping part or may form a lateral stop.

According to the invention, the contact carrier may have a lateral opening for receiving the at least one clamping part.

According to the invention, the outer contour of the clamping part may substantially correspond to the outer contour of the contact carrier. Alternatively or additionally, the outer contour of the clamping part may be substantially flat.

According to the invention, the outer contour of the clamping part may be arched. This embodiment is particularly advantageous in the case of transparent or translucent clamping parts because the shape can advantageously be chosen so that a magnification of the position indication of the optical waveguide in the contact carrier is possible (magnifying function).

According to the invention, the contact carrier may have a cross-section which is substantially round, oval, elliptical or rectangular (preferably having rounded corners).

According to the invention, the contact carrier may have a cross-section which is asymmetrical. The asymmetrical embodiment of the cross-section has the advantage that "coding" ensures the correct positioning of the clamping part. Alternatively, the clamping part may also be completely symmetrical so that it can be correctly arranged in both directions. This facilitates assembly but means a large installation space and higher material and manufacturing costs.

According to the invention, the fibre may have a core of optically transparent material with little attenuation and a sheath which surrounds the core and has a lower refractive index than the core. An insulation is provided around the sheath. Advantageously, the optical waveguide furthermore has strain relief fibres.

According to the invention, the core may be formed from plastic or glass.

According to the invention, the contact carrier may have a tube which is preferably formed for receiving the fibre or the core of the fibre of the optical waveguide.

According to the invention, the optical waveguide plug part may have a cap which has a passage for the optical waveguide and can preferably be connected water-tight to the contact carrier.

According to the invention, the optical waveguide plug part may be capable of being united with a counter-plug part.

According to the invention, the optical waveguide plug part may have the peg or the pegs or a receptacle part of a bayonet coupling.

According to the invention, the clamping part may be formed from metal and/or plastic.

According to the invention, the clamping part may be a diecast part.

According to the invention, the contact carrier may be formed from metal and/or plastic.

According to the invention, the clamping part may have a clamping section for clamping the fibre of the optical waveguide.

According to the invention, the cap and the contact carrier may be formed as one part.

According to the invention, the clamping part and the seal may be formed as one part.

According to the invention, the contact carrier and the seal may be formed as one part.

According to the invention, the contact carrier may have thread sections for screwing in the covering and/or the fibre of the optical waveguide. In the embodiments of the invention, this fastening and strain relief can be additionally provided with the at least two clamping sections of the clamping part. The optical waveguide is then first screwed into the optical waveguide plug part, and the clamping part is then pushed into the contact carrier, the optical waveguide being clamped. In the other embodiments of the optical waveguide plug part which do not necessarily have the two clamping sections (one clamping section for the covering or the fibre or no clamping section is required), it is likewise possible to provide such a strain relief.

The invention also relates to a strapping plug having at least one optical waveguide plug part according to the invention (or the abovementioned features).

Preferably, the strapping plug according to the invention has two optical waveguide plug parts according to the invention.

The clamping parts of the two optical waveguide plug parts can preferably be connected to one another.

According to the invention, the clamping parts of the two optical waveguide plug parts may be in the form of one piece.

According to the invention, the clamping parts of the two optical waveguide plug parts may be rigidly connected to one another.

According to the invention, the clamping parts of the two optical waveguide plug parts can be arranged opposite one another.

According to the invention, the clamping parts of the two optical waveguide plug parts may also be connected to one another in a flexible manner. This has the advantage that the distance is variable.

The invention also relates to an optical waveguide plug connector comprising an optical waveguide plug part, which comprises the above-mentioned features, and a counter-plug part.

According to the invention, the counter-plug part may have a shaft for receiving the tube or the core of the optical waveguide.

BRIEF DESCRIPTION OF THE DRAWINGS

The invention is described in more detail below with reference to the working examples shown in the figures.

Figure 1:
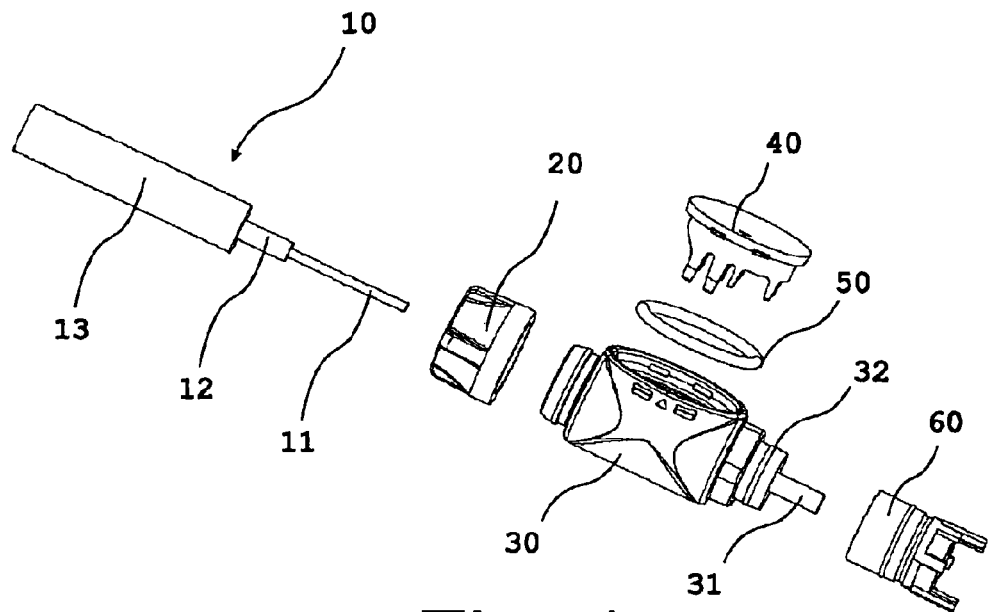
FIG. 1 shows an exploded drawing of an optical waveguide plug part having a base of a counter-plug part according to a first embodiment of the invention.
Figure 2:
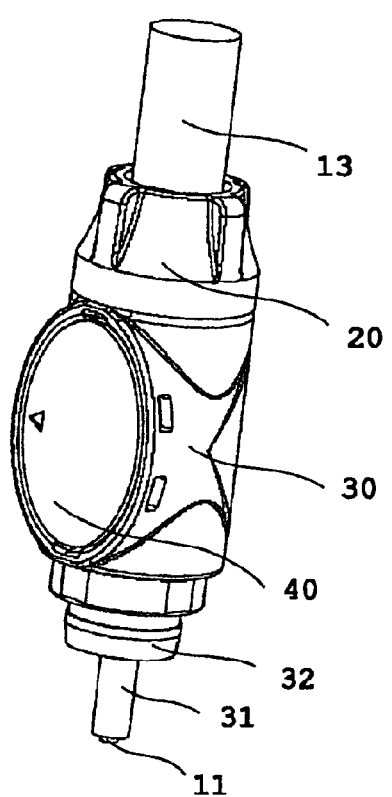
FIG. 2 shows a perspective view of the optical waveguide plug part according to FIG. 1.

The following reference numerals are used in the description of the working examples:

10 optical waveguide
11 core (optically transparent material having little attenuation, e.g. quartz glass, transparent plastic) having a sheath (lower refractive index than the core; core and sheath form the "optical" fibre)
12 insulation (also fibre insulation)
   The insulation forms with the core the fibre.
13 covering (also coating or outer sheath)
   Strain relief fibres are preferably present between covering and insulation but are not shown in the present application for the sake of clarity.
20 cap (also sealing cap)
21 sealing lip
22 snap edge
30 contact carrier
31 tube
32 tube socket
33 bead (projecting outwards)
34 tube end (makes contact or almost makes contact with a transmission/receiving element)
35 locking element
36 recess
37 pin
40 clamping part (for clamping the optical waveguide in the contact carrier and for closing the contact carrier)
41 first clamping section (for example for covering 13)
42 second clamping section (for example for insulation 12)
411 blade elements (in the first clamping section 41)
412 blade elements (in the first clamping section 41)
421 blade elements (in the second clamping section 42)
422 blade elements (in the second clamping section 42)
43 pin
45 flange
46 locking element
47 wall
48 connecting element (for example of two clamping parts)
50 sealing element (O-ring)

DETAILED DESCRIPTION OF THE INVENTION

FIGS. 1 to 9 show a first working example of the invention.

An optical waveguide 10 comprises a core 11 which is surrounded by a sheath of low refractive index, around which an insulation 12 is provided. Strain relief fibres which are not shown are provided around the insulation 12. Furthermore, the optical waveguide has a covering 13.

The working example of the invention which is shown in FIG. 1 to 9 comprises a contact carrier 30 which can be fastened to the optical waveguide 10. For this purpose, the optical waveguide 10 is stripped of insulation according to the diagram in FIG. 1, the cap 20 is pushed onto the optical waveguide 10, and the optical waveguide is pushed into the contact carrier 30 so that the core 11 engages the tube 31. The clamping part 40 with the sealing element 50 is then inserted into the opening in the contact carrier 30. The optical waveguide plug part is thus sealed water-tight. In addition, the optical waveguide is held securely and firmly in the contact carrier 30 because the blade elements 411, 411 and 421, 422 of the two clamping sections 41 and 42, respectively, engage the insulation 12 and the covering 13, respectively.

The clamping part 40 has an oval or elliptical cross-section. Its outer edge is provided with a flange 45 which secures the sealing element 50 on the contact carrier 30. Alternative arrangements for the sealing element are conceivable.

At its outer edge, the clamping part 40 furthermore has locking elements 46 which engage corresponding recesses 36 on the contact carrier 30 (cf. FIG. 7) in order to secure the clamping element 40 on the contact carrier 30.

Figure 3:
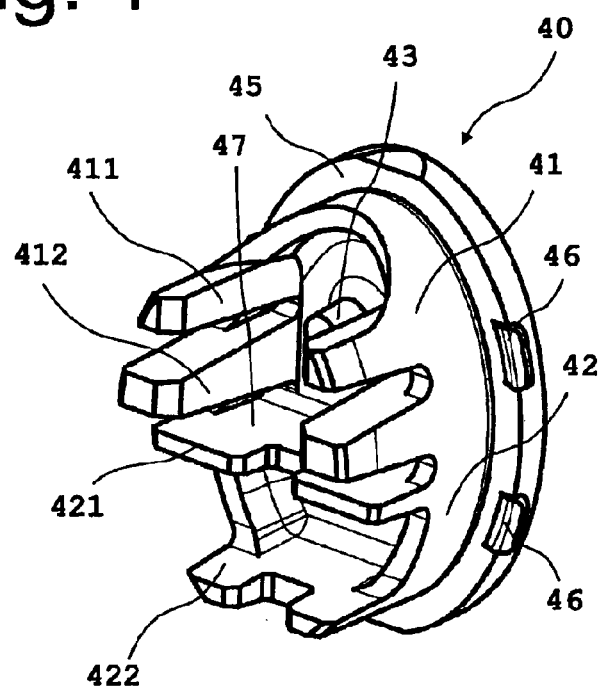
FIG. 3 shows a perspective view of the clamp fastener of the optical waveguide plug part of FIG. 1.
Figure 4:
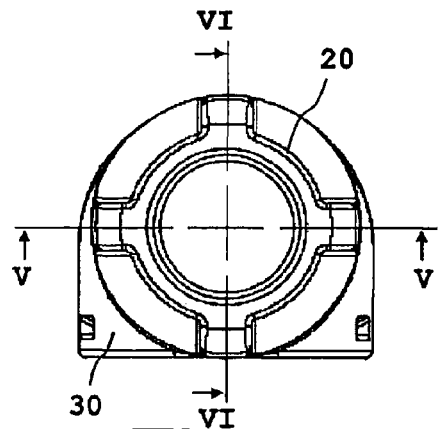
FIG. 4 shows a plan view of an optical waveguide plug connector comprising an optical waveguide plug part according to FIG. 1.
Figure 7:
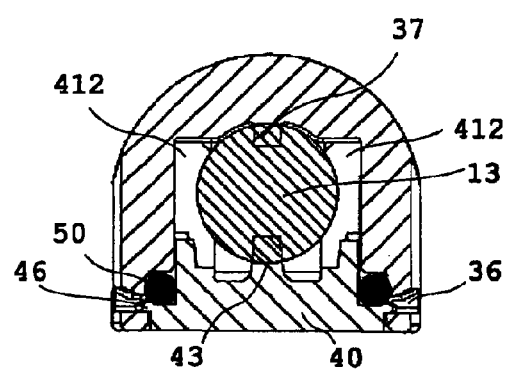
FIG. 7 shows a sectional view according to the sectional line VII-VII in FIG. 6.
Figure 9:
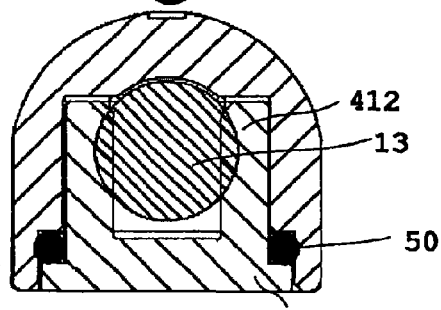
FIG. 9 shows a sectional view according to the sectional line IX-IX in FIG. 6.
Figure 8:
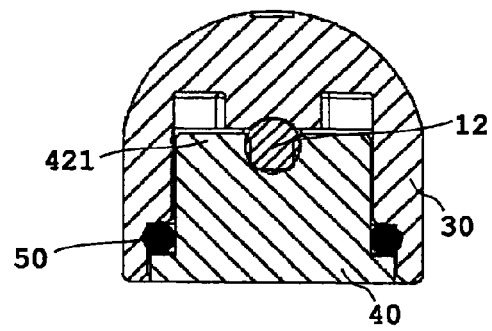
FIG. 8 shows a sectional view according to the sectional line VIII-VIII in FIG. 6.
Figure 5:
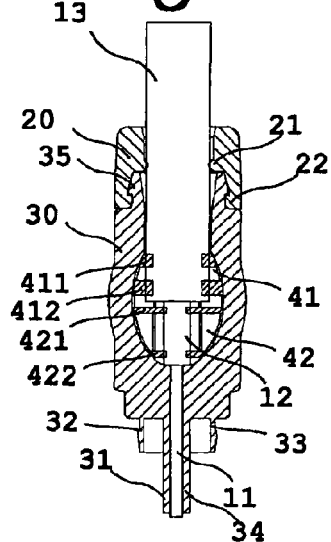
FIG. 5 shows a sectional view according to the sectional line V-V in FIG. 4.
Figure 6:
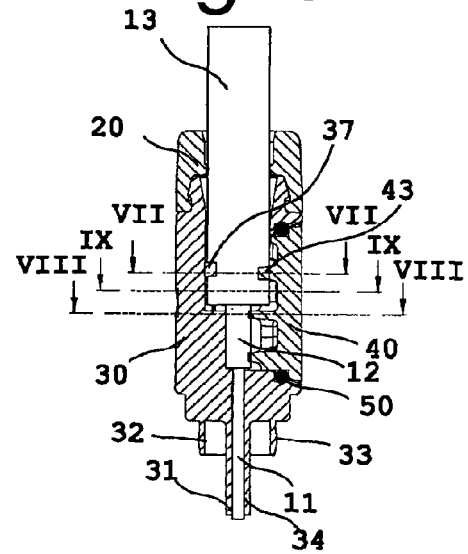
FIG. 6 shows a sectional view according to the sectional line VI-VI in FIG. 4.

The two clamping sections 41 and 42, which are provided in each case with free-standing and/or columnar clamping webs 411, 412 and 421, 422, respectively, are clearly evident in FIG. 3 and FIG. 5.

In addition to the clamping webs there are provided advantageously pins 37 and 43 engaging into the covering 13 for strain relief in the assembled condition. The pin 37 is provided at the contact carrier 30 in the portion opposite to the first clamping section 41 of the clamping part 40. The pin 43 is formed at the clamping part 40 in the first clamping section 41 of the clamping part. It is possible only to provide one of these two pins or several corresponding pins at the contact carrier and/or the clamping part. Furthermore it may be possible, in addition or alternatively to provide corresponding pins in the second clamping section 42 of clamping part 40 and in the portion of the contact carrier 30 being opposite to this section, respectively, engaging into the fibre insulation 12 for further strain relief. Preferably the pins comprise acute edges and barbs, respectively, such that they can easily pierce into the fibre covering and fibre insulation, respectively.

The contact carrier 30 has, at its end facing away from the optical waveguide 10, a tube socket 32 with an outward-projecting bead 33 in order to engage a corresponding counter-plug part, i.e. the base 60 shown in the other two working examples. The tube 31 has a tube end 34 which makes contact or almost makes contact with a transmission/receiving element on insertion of the optical waveguide plug part.

The cap 20 has sealing lips 21 in order to seal the optical waveguide plug part from the optical waveguide 10. The cap 20 furthermore comprises a snap edge 22 which grips around a locking element 35 at the end of the contact carrier in order to fasten the cap 20 to the contact carrier 30.

The clamping part 40 has a wall 47 against which the optical waveguide 10 rests as tightly as possible. The clamping part 40 may be transparent or translucent so that the correct position of the optical waveguide 10 in the optical waveguide plug part can be checked and ensured from the outside after assembly is complete.

The structure of the base for housing the optical waveguide plug part is known to the skilled person for instance from DE 101 26 659 A1, the complete disclosure thereof is incorporated into the present disclosure by reference.

While the clamping part 40 of the embodiment shown in FIGS. 1 to 9 has an oval or elliptical cross-section (cf. for instance FIG. 5), the clamping part can according to alternative embodiments also have a round or circular cross-section. Other shapes are conceivable. For example, the clamping part 40 can be arched instead of flat on the outside or can be formed to correspond to the outer contour of the contact carrier.

According to a variant of the clamping part, the seal may be arranged in such a way that the seal surrounds the optical waveguide. This embodiment gives good results but is not very preferable because in principle water can travel past the clamping piece, between covering and insulation. In this embodiment, it is therefore preferable additionally to provide a seal between the clamping piece and the contact carrier. This embodiment furthermore has a somewhat smaller maximum achievable strain relief because, owing to the seal arrangement of the sealing element, the second clamping section has a short construction and the clamping piece accordingly has a longer construction than in the embodiment shown in FIGS. 1 to 9 and described above.

Other obvious alternatives known to the person skilled in the art and intended for fastening of the optical waveguide plug part to the base are conceivable.

It is clear that alternatives obvious to the person skilled in the art on studying the documents and equivalent solutions should also be within the scope of protection of the present application.

The invention claimed is:

1. Optical waveguide plug part of an optical waveguide plug connector for an optical waveguide, which has a fibre and a covering, comprising a contact carrier for receiving the optical waveguide and at least one clamping part for securing the optical waveguide in the contact carrier, wherein the clamping part has a first clamping section with at least one free-standing and/or columnar clamping web for clamping the covering of the optical waveguide and a second clamping section with at least one free-standing and/or columnar clamping web for clamping the fibre of the optical waveguide.

2. Optical waveguide plug part according to claim 1, in which the free-standing and/or columnar clamping webs of at least one of the first or second clamping section are arranged in pairs such that the clamping webs of one respective pair are arranged oppositely with respect to the optical waveguide.

3. Optical waveguide plug part according to claim 1, wherein the free-standing and/or columnar clamping web(s) of the first clamping section have blade edges for cutting into the covering of the optical waveguide.

4. Optical waveguide plug part according to claim 3, in which the blade edges are substantially perpendicular to the direction in which the optical waveguide can be inserted or is inserted into the optical waveguide plug part.

5. Optical waveguide plug part according claim 1, in which the outer contour of the clamping part at least one of substantially corresponds to the outer contour of the contact carrier or is arched.

6. Optical waveguide plug part according to claim 1, in which free-standing and/or columnar clamping webs(s) of at least one of the first or the second clamping section have, in cross-section, a barb-like profile.

7. Optical waveguide plug part according to claim 1, in which at least one pin and for engaging into the covering of the optical waveguide is formed in the first clamping section and/or at least one pin for engaging into the fibre of the optical waveguide is formed in the second clamping section and/or at least one pin for engaging into at least one of the covering or the fibre of the optical waveguide is formed in the contact carrier.

8. Optical waveguide plug part according to claim 7, in which the at least one pin is arranged and formed such that it engages into the covering and/or fibre of the optical waveguide on assembly and/or at least one pin is arranged and formed such that it pierces the covering and/or fibre of the optical waveguide on assembly and/or multiple pins are arranged and formed in opposite pairs at the contact carrier and the clamping part and/or at least one pin is disposed at the contact carrier opposite to at least one clamping web.

9. Optical waveguide plug part according to claim 1, in which the free-standing and/or columnar clamping web(s) of the second clamping section have blade edges for cutting into the fibre of the optical waveguide.

10. Optical waveguide plug part according to claim 9, wherein the blade edges are substantially perpendicular to the direction in which the optical waveguide can be inserted or is inserted into the optical waveguide plug part.

11. Optical waveguide plug part according to claim 1, wherein the contact carrier has a lateral opening for receiving the at least one clamping part.

12. Optical waveguide plug part according to claim 1, in which the contact carrier is transparent and/or translucent at least in the region of the receiving section for the clamping part.

13. Optical waveguide plug part according to claim 1, in which the clamping part and/or the contact carrier has a colour marking for identifying the position of the optical waveguide in the optical waveguide plug part.

14. Optical waveguide plug part according to claim 1, in which the clamping part and/or the contact carrier are at least partly transparent and/or translucent.

15. Optical waveguide plug part according to claim 1, in which the clamping part is completely transparent and/or translucent.

16. Optical waveguide plug part according to claim 1, in which at least one seal is arranged on the clamping part.

17. Optical waveguide plug part according to claim 16, in which the seal is arranged along the opening of the contact carrier, in which the clamping part is arranged or can be arranged for securing the optical waveguide.

18. Optical waveguide plug part according to claim 16, in which a (further) seal is provided which is arranged in such a way that the fibre of the optical waveguide can be inserted through the seal.

19. Optical waveguide plug part according to claim 16, in which the seal is an O-ring seal.

20. Optical waveguide plug part according to claim 16, in which the clamping part has at least one of a flange or a groove for holding the seal and/or the contact carrier has a groove and/or a step for holding the seal.

* * * * *